Figure 1:
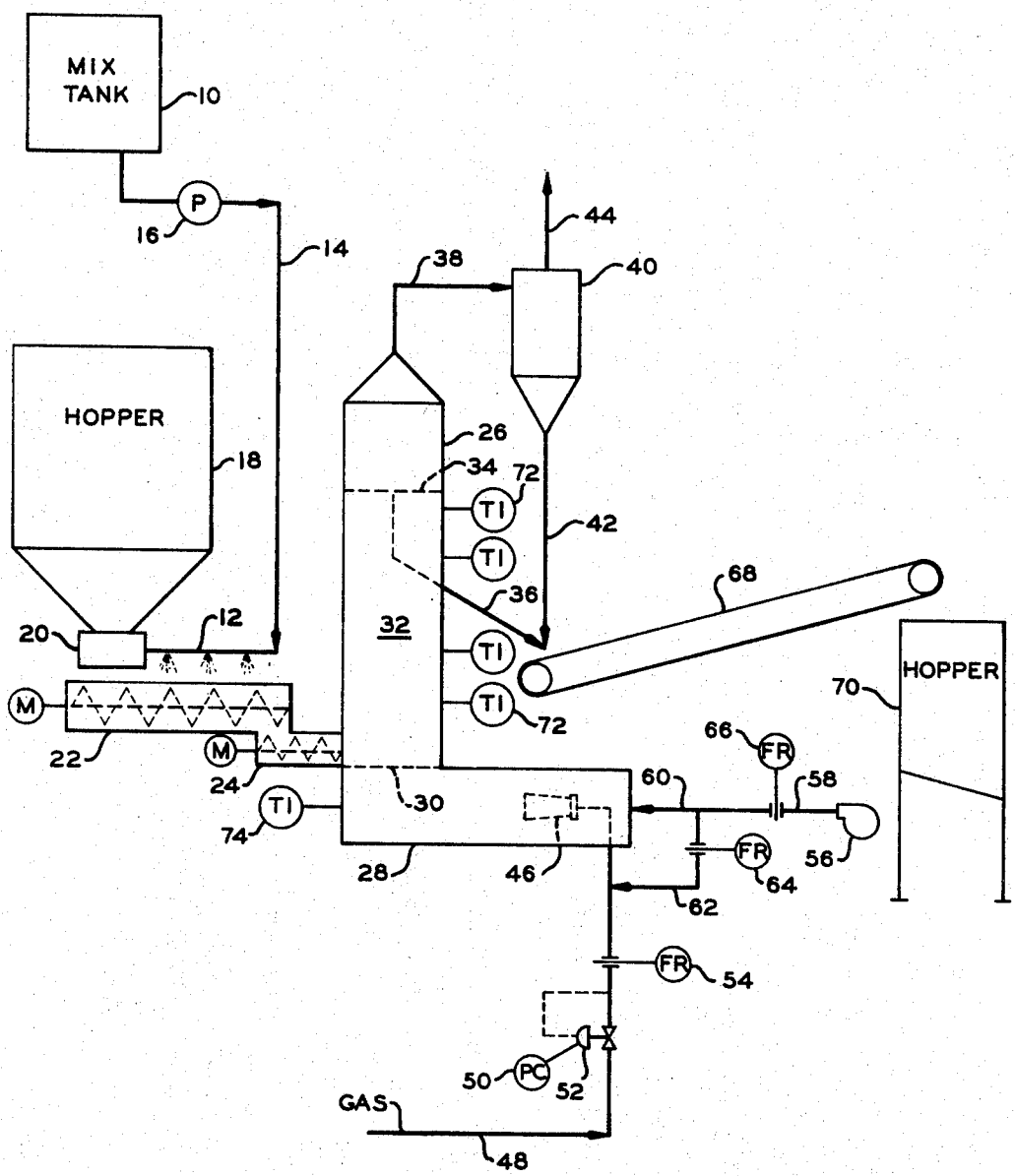

INVENTORS
D.S. JOY
R.E. DOLLINGER

BY Young & Quigg

ATTORNEYS

March 19, 1968  D. S. JOY ET AL  3,374,181
PREPARATION OF COPPER TREATER CATALYST
Filed Aug. 3, 1964  2 Sheets-Sheet 2

INVENTORS
D.S. JOY
R.E. DOLLINGER
BY
Young & Quigg
ATTORNEYS

United States Patent Office 3,374,181
Patented Mar. 19, 1968

3,374,181
PREPARATION OF COPPER TREATER CATALYST
David S. Joy, Bartlesville, Okla., and Robert E. Dollinger, Borger, Tex., assignors to Phillips Petroleum Company, a corporation of Delaware
Filed Aug. 3, 1964, Ser. No. 386,866
10 Claims. (Cl. 252—440)

This invention relates to a process for preparing a copper treater catalyst as disclosed in U.S. Patent 2,094,485 to Albert E. Buell.

The copper treater catalyst or reagent of the aforesaid patent has heretofore been prepared by application of the selected salt solution to a mass of adsorbent in a bin or tank followed by shoveling the impregnated mass of fuller's earth much in the manner of mixing a Portland cement, sand, and water mix, followed by drying the mixture in drying pans in an oven. This method has not consistently produced a uniform distribution of the impregnating salt solution on the adsorbent.

The present invention is directed to an improved method of incorporating the aqueous copper salt solution on the adsorbent and drying the impregnated mass of adsorbent to a selected water content in the range of about 10 to 20 weight percent.

Accordingly, it is an object of the invention to provide a simple and efficient process for impregnating a solid porous adsorbent such as fuller's earth with a salt solution providing cupric copper and chloride ions. Another object is to provide an efficient method of drying a particulate adsorbent impregnated with an aqueous copper salt solution. Other objects of the invention will become apparent upon consideration of the accompanying disclosure.

In accordance with the aforesaid patent, a solution of cupric chloride or a mixture of salts which yield cupric chloride is dispersed in the selected adsorbent to provide a cupric chloride equivalent in the reagent or catalyst in the range of 5 to 10 weight percent of the finished product. The cupric chloride content of the reagent may be varied outside of these limits without departing from the scope of the present invention. Fuller's earth is the preferred adsorbent but other adsorbents such as charcoal, silica gel, alumina, pumice, aluminum silicate clays properly activated, and other similar adsorbents may be used as the support for the cupric chloride portion of the composite.

A broad aspect of the invention comprises spraying the selected salt solution onto a mass of the selected adsorbent in a mixing and blending zone to provide the desired uniform concentration of cupric chloride in the adsorbent, passing the resulting homogeneous mixture into a fluidized bed drying zone and maintaining the particulate material in suspension in a fluidized bed in said zone by passing a fluidizing and drying gas upwardly thru the bed so as to reduce the water content of the material to the range of about 10 to 20 weight percent, and preferably to about 15 weight percent, and leave the salt in a concentrated solution in the remaining liquid in the adsorbent, and recovering the partially dried adsorbent from the drying zone.

Figure 2:
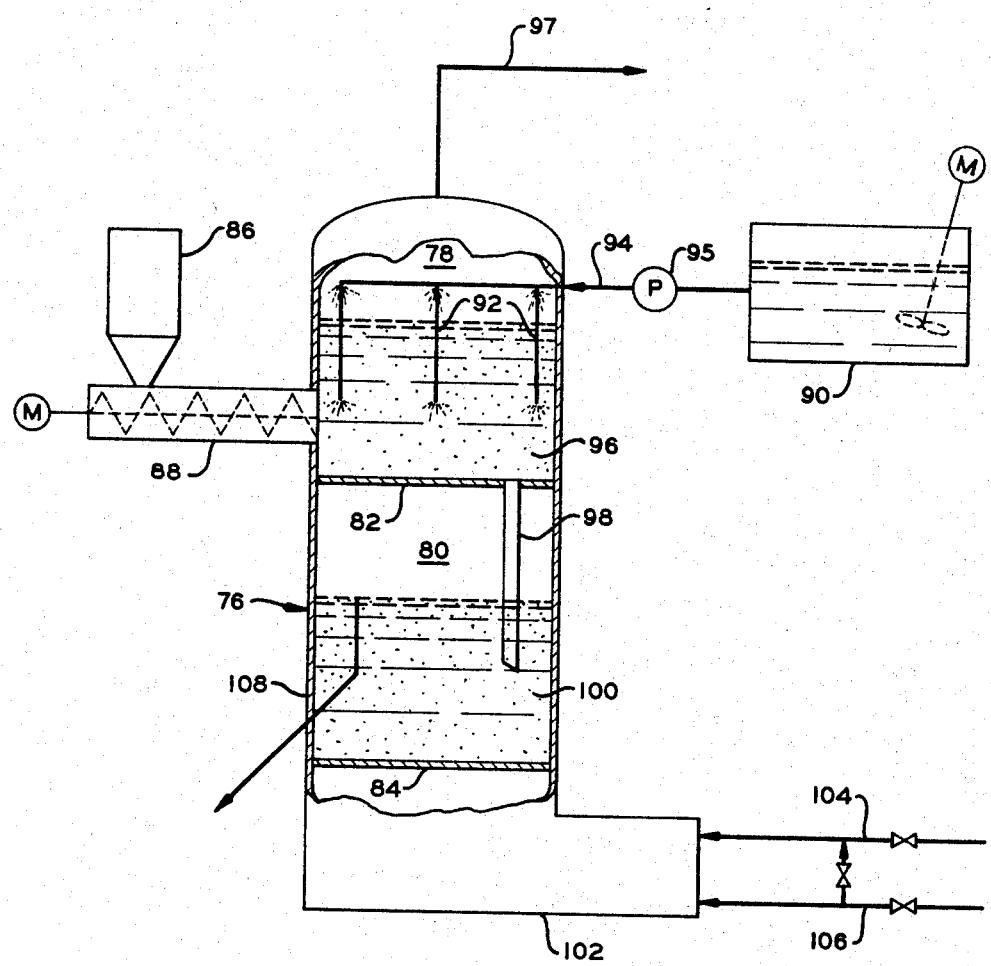

A more complete understanding of the invention may be had by reference to the accompanying schematic drawing of which FIGURE 1 is a flow of a preferred embodiment of the process of the invention, and FIGURE 2 is an elevation in partial section of another embodiment of the dryer in the flow of FIGURE 1.

Referring to FIGURE 1, a mixing tank 10 for the salt solution is connected with a spray line 12 by means of line 14 containing a gear pump 16. This gear pump is a Hastaloy pump and all of the equipment contacted with the salt solution during the process is fabricated of corrosion resistant material such as stainless steel or plastic material such as Marlex polyolefins of Phillips Petroleum Company, Teflon, etc. The lines and conduits are preferably fabricated of Marlex pipe.

A hopper 18 is provided with a vibrating feeder 20 which feeds the adsorbent into a mixing and blending device 22, preferably a ribbon blender, into which spray line 12 directs a dispersion of the salt solution. A ribbon blender simultaneously passes the adsorbent longitudinally therethru and effects a spiral blending movement thereof. The resulting homogeneous mixture of adsorbent and salt solution is fed by screw conveyor 24 or other suitable means into a fluidized bed dryer 26.

Dryer 26 is positioned directly above the downstream end of furnace 28 and is separated therefrom by a gas distributor plate 30 which uniformly distributes the drying and fluidizing gas over the transverse cross section of the dryer. A fluidized bed of adsorbent 32 is maintained in the lower section of dryer 26 and extends to about the level indicated at 34 from which outlet 36 extends thru the wall of the dryer. Effluent gas from bed 32 passes thru conduit 38 to a cyclone separator 40 which separates any finely divided adsorbent carried overhead in the gas stream and gravitates the same thru conduit 42. Effluent gas from cyclone 40 substantially free of adsorbent particles is passed thru line 44 to atmosphere or any part of the gas may be recycled to furnace 28, if desired.

Furnace 28 is provided with a burner 46 which is connected by line 48 with a source of fuel gas such as natural gas. The flow of gas is controlled by a pressure controller 50 which is in operating control of motor valve 52 in conventional manner. A flow recorder 54 is also positioned in line 48. Air is supplied by blower 56 and line 58, a portion being injected as tempering air directly into the furnace thru line 60 and another portion being passed to fuel line 48 thru conduit 62 in which a flow recorder 64 is positioned. Likewise, a flow recorder 66 is positioned in line 58.

The partially dried reagent or catalyst passing thru lines 36 and 42 is delivered onto conveyor belt 68 for delivery to a sack loading hopper 70 or other storage or packaging facility.

Temperature indicators 72 are positioned at different levels along fluidized bed 32 and a similar temperature indicator 74 is positioned on the outlet end of furnace 28 to record the furnace outlet gas temperature which is the inlet gas temperature to bed 32.

Referring to FIGURE 2, dryer 76 is separated into an upper drying compartment 78 and a lower drying compartment 80 by means of gas distributor plates 82 and 84. Fuller's earth or other adsorbent is maintained in hopper tank 86 from which it is fed by screw conveyor 88 into the upper drying compartment 78. A salt solution supply tank 90 is connected with a series of sprays 92 in compartment 78 by means of line 94 containing pump 95. Effluent gas from bed 96 is vented thru line 97.

This system sprays the selected salt solution onto the fuller's earth particles in fluidized bed 96.

A down-spout 98 extends thru distributor plate 82 and is provided with a trickle valve (not shown) and terminates above plate 84 within fluidized bed 100. Fluidizing gas is provided by furnace 102 which is supplied with fuel gas from line 104 and air from line 106 in similar manner to the firing of furnace 28 of FIGURE 1. Partially dried product is recovered from bed 100 thru delivery line 108.

In the operation of the apparatus of FIGURE 2, the solution in tank 90 is made up by introducing 625 lbs. of water per hour, 200 lbs. per hour of $CuSO_4 \cdot 5H_2O$, and 158 lbs. per hour of NaCl. This represents the feed rate of this solution to bed 96. The feed rate of fuller's earth thru screw conveyor 88 is 1875 lbs. per hour and the adsorbent contains 6 weight percent $H_2O$. Furnace 102 is operated to provide an outlet gas temperature (inlet drying gas temperature) of about 1200° F. and supplies heat at the rate of 542,100 B.t.u. per hour to bed 100. The temperature in bed 100 is maintained at about 170° F. while the temperature in bed 96 is maintained at about 100° F. The flow rate of gas thru bed 100 is maintained in the range of about 150 to 200' per minute. The effluent gas in line 97 carries off about 457 lbs. per hour of $H_2O$ from the drying process. The product in line 108 amounts to 1762 lbs. per hour of fuller's earth, 158 lbs. per hour of NaCl, 250 lbs. per hour of $CuSO_4 \cdot 5H_2O$, and 280 lbs. per hours of $H_2O$.

In one embodiment of the invention, hopper 18 is a wooden hopper 6' x 6' and 4' high having a variable speed vibrating feeder positioned at the bottom thereof. A ribbon blender 20" in diameter and 5' long lined with Marlex (trademark of Phillips Petroleum Company) and having a capacity of one cubic foot thruput per minute is positioned to receive the adsorbent from the vibratory feeder and deliver same to a conventional screw feeder 6" in diameter and 18" long similarly lined with Marlex. A Hastaloy gear pump feeding at the rate of 1.2 gallons/minute is positioned in Marlex line 14 and delivers the aqueous salt solution consisting of water, sodium chloride, and copper sulfate to a series of sprays directly over the ribbon blender.

The drying chamber is 24" in diameter and 7' in height and is fabricated of vitreous pipe. Conduit 38 is fabricated of Marlex pipe as are conduits 42 and 44. Line 36 is fabricated of vitreous pipe.

Furnace 28 is fabricated of 30" diameter pipe 10' in length having a wall thickness of ¼" and lined with corrosion resistant material. Fuel gas (natural gas) is fed at the rate of 800 s.c.f.h. thru line 48 and air is fed thru line 58 at the rate of 24,000 s.c.f.h. at one p.s.i.g., a portion of this air being passed to line 48 to provide at least a stoichiometric proportion with respect to the fuel gas for complete combustion. The furnace outlet gas temperature is maintained at about 1400° F. and the bed temperature in the dryer is maintained at about 170° F.

Bed temperature in the dryer is readily controlled by increasing or decreasing the flow rate of the adsorbent-salt solution mixture. The inlet drying gas temperature (furnace outlet temperature) is controlled within the range of about 800 to 1600° F. and the drying bed temperature is maintained in the range of about 125 to 300° F. so as to leave a moisture content in the adsorbent in the range of about 10 to 20 weight percent. This assures a concentrated solution of the salt or salts in the partially dried adsorbent which facilitates the action of the catalyst or reagent in removing sulfur from a hydrocarbon feed stream.

The process of the invention produces a finished catalyst or reagent of any selected cupric ion content and moisture content. The product is of uniform consistency and can be easily duplicated in successive runs. The manufacturing process is continuous, requires relatively inexpensive equipment, and has high capacity for the size of the equipment. There is no manual handling of the materials utilized in preparing the reagent.

Certain modifications of the invention will become apparent to those skilled in the art and the illustrative details disclosed are not to be construed as imposing unnecessary limitations on the invention.

We claim:

1. A process for preparing a composite comprising essentially cupric and chloride ions in concentrated aqueous solution deposited on a porous adsorbent support which comprises the steps of:
    (1) maintaining an agitated moving bed of said porous adsorbent support;
    (2) spraying said solution in substantial excess of the final concentration obtained in step (3) onto said support in the bed of step (1) so as to form an essentially homogeneous mixture of support and solution at a rate to provide the desired cupric ion concentration;
    (3) suspending the resulting mixture of step (2) in a fluidized bed drying zone in a hot drying gas so as to partially dry said mixture to a water content in the range of about 10 to 20 weight percent and leave a concentrated solution of cupric and chloride ions thereon; and
    (4) recovering the partially dried composite essentially comprising said support impregnated with concentrated solution.

2. The process of claim 1 wherein the bed of step (1) is horizontally elongated, said adsorbent being moved therethru mechanically from one end to the other and simultaneously given a spiral blending movement.

3. The process of claim 2 wherein said adsorbent is fuller's earth, the residual water content is reduced to about 15 weight percent of the finished product, and the cupric chloride equivalent in said product is in the range of about 5 to 10 weight percent thereof.

4. The process of claim 1 wherein the bed of step (1) is a fluidized bed.

5. The process of claim 4 wherein the fluidized bed of step (1) is positioned adjacently above the fluidized bed of step (3) and the effluent mixture from the upper bed is gravitated thru an upright transport zone to the lower bed.

6. The process of claim 1 wherein said support is fuller's earth and said salt solution is a mixture of copper sulfate and sodium chloride.

7. The process of claim 1 wherein said support is fuller's earth and said salt solution is a solution of copper chloride.

8. The process of claim 1 wherein the drying gas of step (3) is formed by burning a fuel gas with air to form combustion gas and tempering said combustion gas with air to provide a drying gas temperature in the range of about 800 to 1600° F.

9. The process of claim 8 wherein the feed rate of the mixture in step (3) is regulated to provide a bed temperature in the range of about 125 to 300° F.

10. A method of partially drying an adsorbent having adsorbed thereon an aqueous salt solution containing cupric and chloride ions in substantial excess of the final concentration obtained in step (4) which comprises the steps of:
    (1) continuously feeding said adsorbent into a fluidized bed drying zone;
    (2) maintaining the adsorbent of step (1) in a fluidized bed by passing a hot fluidizing and drying gas at a temperature in the range of 800 to 1600° F. upwardly thru the drying zone of step (1);
    (3) controlling the feed rate of said adsorbent in step (1) so as to maintain a bed temperature in the range of about 125 to 300° F.; and (4) withdrawing partially dried adsorbent from said bed at a rate which leaves a concentrated aqueous solution of said salt in the impregnated adsorbent in the range of 10 to 20 weight percent.

References Cited

UNITED STATES PATENTS

| | | | |
|---|---|---|---|
| 2,082,518 | 6/1937 | Ruthruff | 252—442 X |
| 2,223,643 | 12/1940 | Shoemaker | 252—441 X |
| 2,408,164 | 9/1946 | Foster | 252—442 |

FOREIGN PATENTS 941,353  11/1963  Great Britain.

OTHER REFERENCES

Zinz-Othmer book "Fluidization and Fluid-Particle Systems," 1960 ed., pp. 30–32, Reinhold Pub. Corp., New York.

DANIEL E. WYMAN, *Primary Examiner.*

EDWARD STERN, *Examiner.*

C. F. DEES, *Assistant Examiner.*